United States Patent
Varadarajan

(10) Patent No.: US 9,043,232 B1
(45) Date of Patent: May 26, 2015

(54) ASSOCIATING ITEM IMAGES WITH ITEM CATALOG DATA

(75) Inventor: Anand Varadarajan, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 388 days.

(21) Appl. No.: 12/852,980

(22) Filed: Aug. 9, 2010

(51) Int. Cl.
*G06Q 30/06* (2012.01)
*G06T 7/00* (2006.01)

(52) U.S. Cl.
CPC .......... *G06Q 30/0641* (2013.01); *G06T 7/0044* (2013.01)

(58) Field of Classification Search
CPC .......... G06Q 30/0623; G06Q 30/0641; G06Q 30/0202; G06T 7/0044; G06T 2207/30; G06K 9/46
USPC .............. 705/27.1, 26.61; 382/190
See application file for complete search history.

(56) References Cited

U.S. PATENT DOCUMENTS

| | | | | |
|---|---|---|---|---|
| 7,596,552 | B2 * | 9/2009 | Levy et al. .......................... 1/1 |
| 7,734,729 | B2 * | 6/2010 | Du et al. ....................... 709/219 |
| 8,209,240 | B2 * | 6/2012 | Ryu et al. ..................... 705/27.1 |
| 8,321,293 | B2 * | 11/2012 | Lewis et al. .................. 705/26.1 |
| 2002/0165801 | A1 * | 11/2002 | Stern et al. ...................... 705/27 |
| 2003/0177076 | A1 * | 9/2003 | Might et al. ..................... 705/28 |
| 2004/0225568 | A1 * | 11/2004 | Peressini et al. ................. 705/22 |
| 2005/0131919 | A1 * | 6/2005 | Brookler et al. ............... 707/100 |
| 2007/0081744 | A1 * | 4/2007 | Gokturk et al. ................ 382/305 |
| 2007/0100713 | A1 * | 5/2007 | Del Favero et al. ............. 705/29 |
| 2007/0100779 | A1 * | 5/2007 | Levy et al. ..................... 705/500 |
| 2007/0150403 | A1 * | 6/2007 | Mock et al. ..................... 705/37 |
| 2008/0147566 | A1 * | 6/2008 | Malik ......................... 705/36 R |
| 2008/0154898 | A1 * | 6/2008 | Cheng et al. ..................... 707/6 |
| 2008/0279481 | A1 * | 11/2008 | Ando ............................ 382/306 |
| 2010/0217684 | A1 * | 8/2010 | Melcher et al. ................. 705/27 |
| 2011/0295693 | A1 * | 12/2011 | Clavin et al. ............... 705/14.66 |

OTHER PUBLICATIONS

U.S. Appl. No. 12/378,599, filed Feb. 18, 2009, entitled Method and System for Image Matching.
U.S. Appl. No. 12/321,235, filed Jan. 16, 2009, entitled System and Method to Match Images.
U.S. Appl. No. 11/732,858, filed Apr. 4, 2007, entitled "Method and System for Searching for Information on a Network in Response to an Image Query Sent by a User From a Mobile Communications Device."
IDEE, Inc., About Tineye, http://www.tineye.com/about, Copyright 2010.

* cited by examiner

*Primary Examiner* — Amee A Shah
(74) *Attorney, Agent, or Firm* — Thomas | Horstemeyer, LLP

(57) ABSTRACT

An image of an item is obtained in one or more computing devices. The item is identified from the image based at least in part on data derived from reference images that are each associated with one or more items. Catalog data corresponding to the item is associated with the image. The catalog data is added to a merchant catalog in an electronic marketplace.

20 Claims, 5 Drawing Sheets

_(54)_ ASSOCIATING ITEM IMAGES WITH ITEM CATALOG DATA

BACKGROUND

Establishing an online catalog may be a frustrating process for a merchant. For example, a merchant may have to submit a spreadsheet or a file of comma-separated values including descriptions of all the items that the merchant would like to sell. Such descriptions may include titles, keywords, shipping weights, tax classifications, hazardous classifications, inventory quantities, and other descriptive material. Creating such a spreadsheet or file manually may be time consuming and prone to errors.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to associating item images with item catalog data. As used herein, the term "item" may refer to a product, good, service, software download, multimedia download, social networking profile, or other item that may be offered for sale, purchase, rental, lease, download, and/or any other form of consumption as may be appreciated. Embodiments of the present disclosure allow a merchant to add items to an online catalog by simply providing images of the items.

Figure 1:
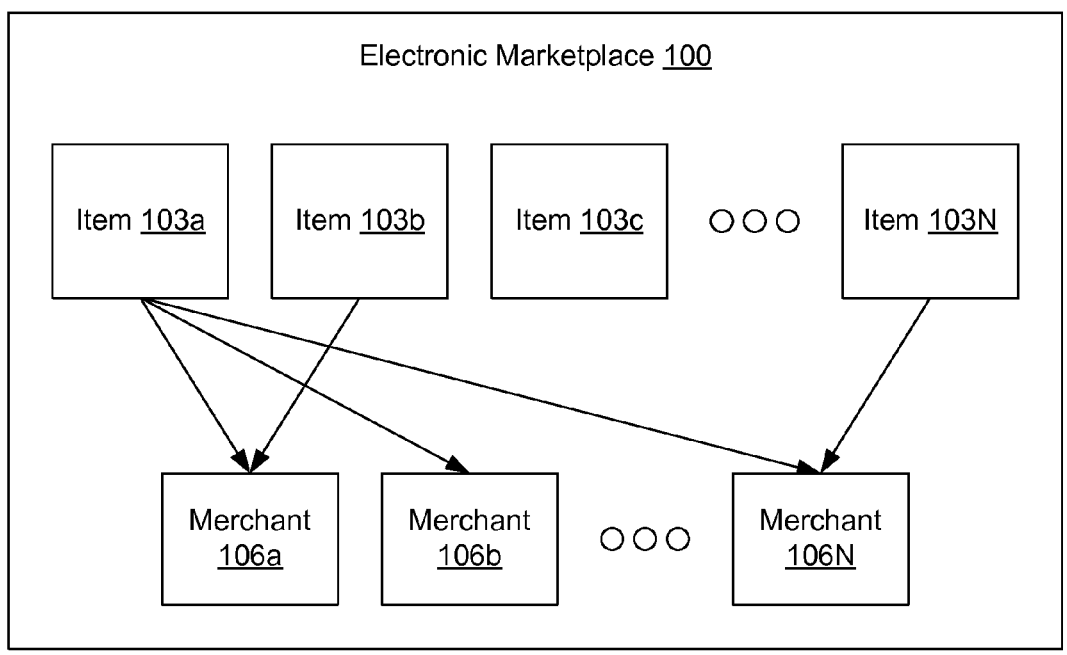
FIG. 1 is a drawing of an example of an electronic marketplace according to an embodiment of the present disclosure.

With reference to FIG. 1, shown is a drawing of one example of an electronic marketplace 100. An electronic marketplace 100 facilitates the offering of a plurality of items 103 for sale, purchase, rental, lease, download, and/or any other form of consumption by a plurality of merchants 106. Although the merchants 106 may have separate catalogs of items 103, the merchants 106 may share a master catalog of items 103 in various embodiments. In other words, multiple merchants 106 may sell the same type of item 103 using the same description.

As a non-limiting example, in FIG. 1, merchants 106a, 106b, and 106N all sell item 103a, which may have a common description. Meanwhile, items 103b and 103N may be sold by merchants 106a and 106N, respectively. Accordingly, the descriptions of items 103b and 103N may be exclusively in separate catalogs associated with the merchants 106a and 106N or may also be in a master catalog even though they are each associated with one merchant 106. Likewise, some items 103 with descriptions in the master catalog, such as item 103c, may not be offered by any merchant 106 in the electronic marketplace 100. Descriptions of such items 103 may be provided, for example, by manufacturers or distributors of the items 103 in anticipation of the items 103 possibly being offered by merchants 106 in the electronic marketplace 100 in the future.

The use of a master catalog in an electronic marketplace 100 may allow a merchant user to employ the system presented herein to associate images of items 103 with preexisting descriptions of the items 103 from the catalog data. Accordingly, the merchant user may avoid having to fill out a form or spreadsheet with potentially dozens of attributes to describe an item 103. In addition, an image of an item 103 may be more quickly mapped to an image of an item 103 in the master catalog than a user-supplied title of an item 103 that may not match a stored title. Further, it may be significantly easier for a merchant 106 to take digital photos of the items 103 in inventory than to search for or manually enter descriptions of the items 103. In the following discussion, a general description of the system and its components is provided, followed by a discussion of the operation of the same.

Figure 2:
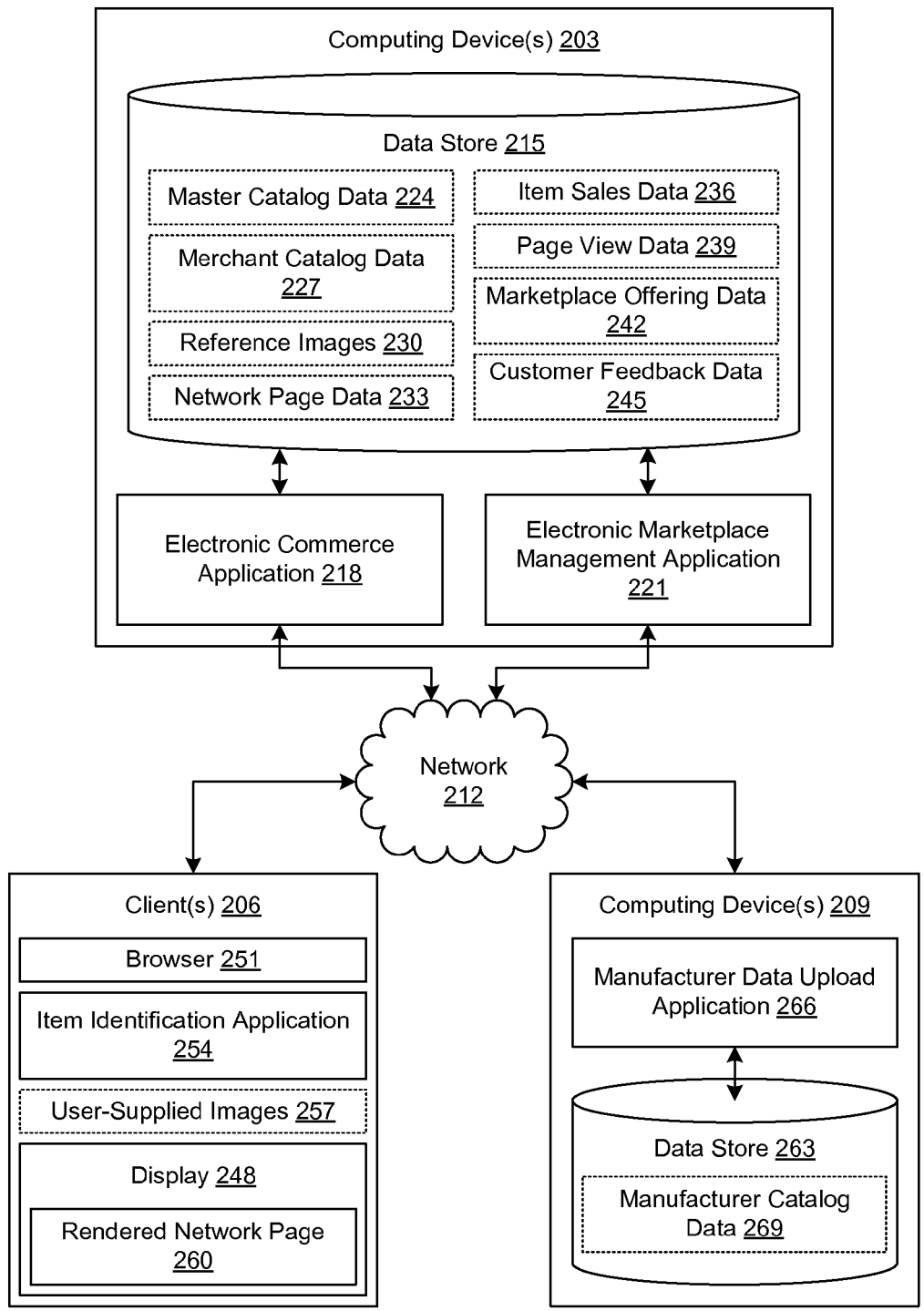
FIGS. 2 and 3 are drawings of networked environments according to various embodiments of the present disclosure.

Referring next to FIG. 2, shown is a networked environment 200 according to various embodiments. The networked environment 200 includes one or more computing devices 203, one or more clients 206, and one or more computing devices 209 in data communication by way of a network 212. The network 212 includes, for example, the Internet, intranets, extranets, wide area networks (WANs), local area networks (LANs), wired networks, wireless networks, or other suitable networks, etc., or any combination of two or more such networks.

The computing device 203 may comprise, for example, a server computer or any other system providing computing capability. Alternatively, a plurality of computing devices 203 may be employed that are arranged, for example, in one or more server banks or computer banks or other arrangements. For example, a plurality of computing devices 203 together may comprise, for example, a cloud computing resource, a grid computing resource, and/or any other distributed computing arrangement. Such computing devices 203 may be located in a single installation or may be dispersed among many different geographical locations. For purposes of convenience, the computing device 203 is referred to herein in the singular. Even though the computing device 203 is referred to in the singular, it is understood that a plurality of computing devices 203 may be employed in the various arrangements as described above.

Various applications and/or other functionality may be executed in the computing device 203 according to various embodiments. Also, various data is stored in a data store 215 that is accessible to the computing device 203. The data store 215 may be representative of a plurality of data stores 215 as can be appreciated. The data stored in the data store 215, for example, is associated with the operation of the various applications and/or functional entities described below.

The components executed on the computing device 203, for example, include an electronic commerce application 218, an electronic marketplace management application 221, and other applications, services, processes, systems, engines, or functionality not discussed in detail herein. The electronic commerce application 218 is executed in order to facilitate the online purchase of items 103 (FIG. 1) from merchants 106 (FIG. 1) in an electronic marketplace 100 (FIG. 1) over the network 212. The electronic commerce application 218 also performs various backend functions associated with the online presence of a merchant in order to facilitate the online purchase of items 103 as will be described. For example, the electronic commerce application 218 generates network pages such as web pages or other types of network content that are provided to clients 206 for the purposes of selecting items for purchase, rental, download, lease, or other forms of consumption.

The electronic marketplace management application 221 is executed in order to facilitate management of the presence of merchants 106 in an electronic marketplace 100. To this end, the electronic marketplace management application 221 may facilitate managing an online catalog of merchants 106, including adding new items 103, removing items 103, editing data associated with items 103, and other tasks. In various embodiments, the electronic marketplace management application 221 may be structured with various portions on the server side and executing in the computing device 203 and various portions on the client side and executing in the client 206. In one non-limiting example, the server portions of the electronic marketplace management application 221 may be configured to receive a data feed and/or commands from a client portion of the electronic marketplace management application 221. In another non-limiting example, the server portions of the electronic marketplace management application 221 may generate network pages providing a user interface.

The data stored in the data store 215 includes, for example, master catalog data 224, merchant catalog data 227, reference images 230, network page data 233, item sales data 236, page view data 239, marketplace offering data 242, customer feedback data 245, and potentially other data. The master catalog data 224 includes any data that describes items 103 present in a master catalog of an electronic marketplace 100. Such data may include titles, textual descriptions, images and other multimedia, keywords, shipping weights, shipping restrictions, prices, tax classifications, categories, unique identifiers, and so on. Although the items 103 described in the master catalog data 224 may be associated with offerings in the electronic marketplace 100, some of the data may correspond to items 103 with no current offerings. Such data may be provided, for example, by a manufacturer, distributor, or another third party, or may have been previously associated with offerings in the electronic marketplace 100.

The merchant catalog data 227 may include data describing items 103 that are offered by merchants 106 of the electronic marketplace 100. Descriptions of items 103 that are present in the master catalog may be linked to a merchant catalog within the merchant catalog data 227. Alternatively, the descriptions may be duplicated within the merchant catalog data 227. In one embodiment, the descriptions may be copied into merchant catalog data 227 when a merchant 106 edits one or more attributes. Alternatively, edits to descriptions of items 103 may be stored within the master catalog data 224. The merchant catalog data 227 may also include descriptions of items 103 added by a merchant 106 that are not in the master catalog.

The reference images 230 may include a plurality of images that are known to depict items 103 in the master catalog and/or in catalogs of the merchants 106. The reference images 230 may include actual image data or samples thereof. In one embodiment, the reference images 230 may include data derived from the actual image data, including, for example, image fingerprints or hashes, histograms based on image characteristics, extracted features such as text visible in the images, and other data relating to image characteristics that may facilitate accurate and efficient detection of the images.

The network page data 233 may include any data used in generating network pages that may be served up by the electronic commerce application 218 or the electronic marketplace management application 221. As a non-limiting example, the network page data 233 may include templates, code, scripts, style sheets, graphics, hypertext markup language (HTML) data, extensible markup language (XML) data, and/or any other data that may be used in generating network pages. The item sales data 236 may include data related to past sales, downloads, leases, or other forms of consumption of items 103 through the electronic marketplace 100 and/or other electronic marketplaces 100. The page view data 239 may include logs and/or other data relating to network page views through the electronic commerce application 218. In particular, the page view data 239 may be correlated by item 103 to indicate, for example, the number of views of a detail page for an item 103, the number of times an item 103 has been added to shopping carts, and other statistics.

The marketplace offering data 242 may describe past and present offerings of items 103 in the electronic marketplace 100 by merchants 106. The customer feedback data 245 may include customer feedback about items 103. As non-limiting examples, the customer feedback data 245 may include customer reviews, customer ratings, and other forms of feedback.

The client 206 is representative of a plurality of client devices that may be coupled to the network 212. The client 206 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 206 may also include a display 248. The display 248 may comprise, for example, one or more devices such as cathode ray tubes (CRTs), liquid crystal display (LCD) screens, gas plasma-based flat panel displays, LCD projectors, or other types of display devices, etc.

The client 206 may be configured to execute various applications such as a browser 251, an item identification application 254, and/or other applications. The client 206 may also store various data such as user-supplied images 257 and other data. The browser 251 may be executed in a client 206, for example, to access and render network pages, such as web pages or other network content served up by the computing device 203 and/or other servers, thereby generating a rendered network page 260 on the display 248.

The item identification application 254 is executed to analyze the user-supplied images 257 depicting items 103 and to associate the user-supplied images 257 with master catalog data 224 based on identification of the items 103 depicted in the user-supplied images 257. The item identification application 254 may comprise a thin client, thick client, code embedded within rendered network pages 260, and/or other forms of applications. The client 206 may be configured to execute applications beyond the browser 251 and the item identification application 254 such as, for example, email applications, instant message applications, and/or other applications.

The computing device 209 may comprise, for example, a server computer, a client computer, or any other system providing computing capability. Alternatively, a plurality of computing devices 209 may be employed that are arranged, for example, in one or more server banks or computer banks or other arrangements. For example, a plurality of computing devices 209 together may comprise, for example, a cloud computing resource, a grid computing resource, and/or any other distributed computing arrangement. Such computing devices 209 may be located in a single installation or may be dispersed among many different geographical locations. For purposes of convenience, the computing device 209 is referred to herein in the singular. Even though the computing device 209 is referred to in the singular, it is understood that a plurality of computing devices 209 may be employed in the various arrangements as described above. The computing device 209 may be controlled, for example, by a manufacturer or distributor that does not offer items 103 for sale to retail customers.

Various applications and/or other functionality may be executed in the computing device 209 according to various embodiments. Also, various data is stored in a data store 263 that is accessible to the computing device 209. The data store 263 may be representative of a plurality of data stores 263 as can be appreciated. The data stored in the data store 263, for example, is associated with the operation of the various applications and/or functional entities described below.

The components executed on the computing device 209, for example, include a manufacturer data upload application 266 and other applications, services, processes, systems, engines, or functionality not discussed in detail herein. The manufacturer data upload application 266 is executed to generate data feeds to facilitate the upload of descriptions of items 103 to the computing device 203. Such items 103 may comprise a catalog of items 103 manufactured or distributed by the entity that controls the computing device 209. The data stored in the data store 263 includes, for example, manufacturer catalog data 269 and potentially other data. The manufacturer catalog data 269 may describe items 103 that are produced and/or distributed by the entity that controls the computing device 209.

Next, a general description of the operation of the various components of the networked environment 200 is provided. To begin, a user associated with a merchant 106 establishes an account connected with the electronic marketplace 100. The user may supply various data to the electronic marketplace management application 221 in order to complete initial registration. The user may configure basic functionality of the network pages of the online catalog, shipping parameters, tax parameters, look and feel parameters, and so on. Such data may be stored in network page data 233 and used by the electronic commerce application 218 in generating network pages that include offerings of items 103 by the merchant 106.

The user may then define items 103 to be offered in the electronic marketplace 100. The electronic marketplace management application 221 may supply manual or automatic interfaces for uploading descriptions of items 103. For example, the electronic marketplace management application 221 may include a facility for receiving data feeds such as spreadsheets, files of comma-separated values, imports from other database software, etc. The electronic marketplace management application 221 may also provide forms for user input of descriptions of items 103. Such forms may be presented by rendered network pages 260 or other user interfaces rendered on the client 206. The electronic marketplace management application 221 may also provide a facility for the user to search the master catalog data 224 for keywords. Such a keyword search may enable a user to select preexisting items 103 described in the master catalog data 224 for inclusion in the catalog of the merchant 106.

In addition to the above-described approaches for a user to add items 103 to a catalog, the item identification application 254 may permit the user to add items 103 to the catalog for the merchant 106 by providing a set of user-supplied images 257 that depict the new items 103. For example, the user may be able to take digital photos of each type of item 103 in the inventory of the merchant. In one embodiment, each of the user-supplied images 257 may depict a single respective item 103. In another embodiment, each of the user-supplied images 257 may depict multiple respective items 103.

In various embodiments, the user may place the user-supplied images 257 in a designated folder or directory, upload the user-supplied images 257 to the computing device 203, drag and drop graphical indicators of the user-supplied images 257 onto a user interface component of the item identification application 254, and/or provide the user-supplied images 257 to the item identification application 254 by some other mechanism. The item identification application 254 may then be configured to analyze the user-supplied images 257 to identify the items 103 depicted therein. In one embodiment, the item identification application 254 may compare the user-supplied images 257 to the reference images 230 directly. In other embodiments, the item identification application 254 may compare data derived from the reference images 230 or data derived from the reference images 230 with the user-supplied images 257 or data derived from the user-supplied images 257. Such data derived from images may comprise, for example, image fingerprints or hashes, histograms, extracted features, text identified from images, and other data related to image characteristics.

It is understood that such comparisons may be performed in the client 206 or in the computing device 203. As an example, FIG. 2 shows the item identification application 254 being executed in the client 206. The item identification application 254 executed in the client 206 may download the reference images 230 or data derived from the reference images 230 to the client 206 for analysis.

Figure 3:
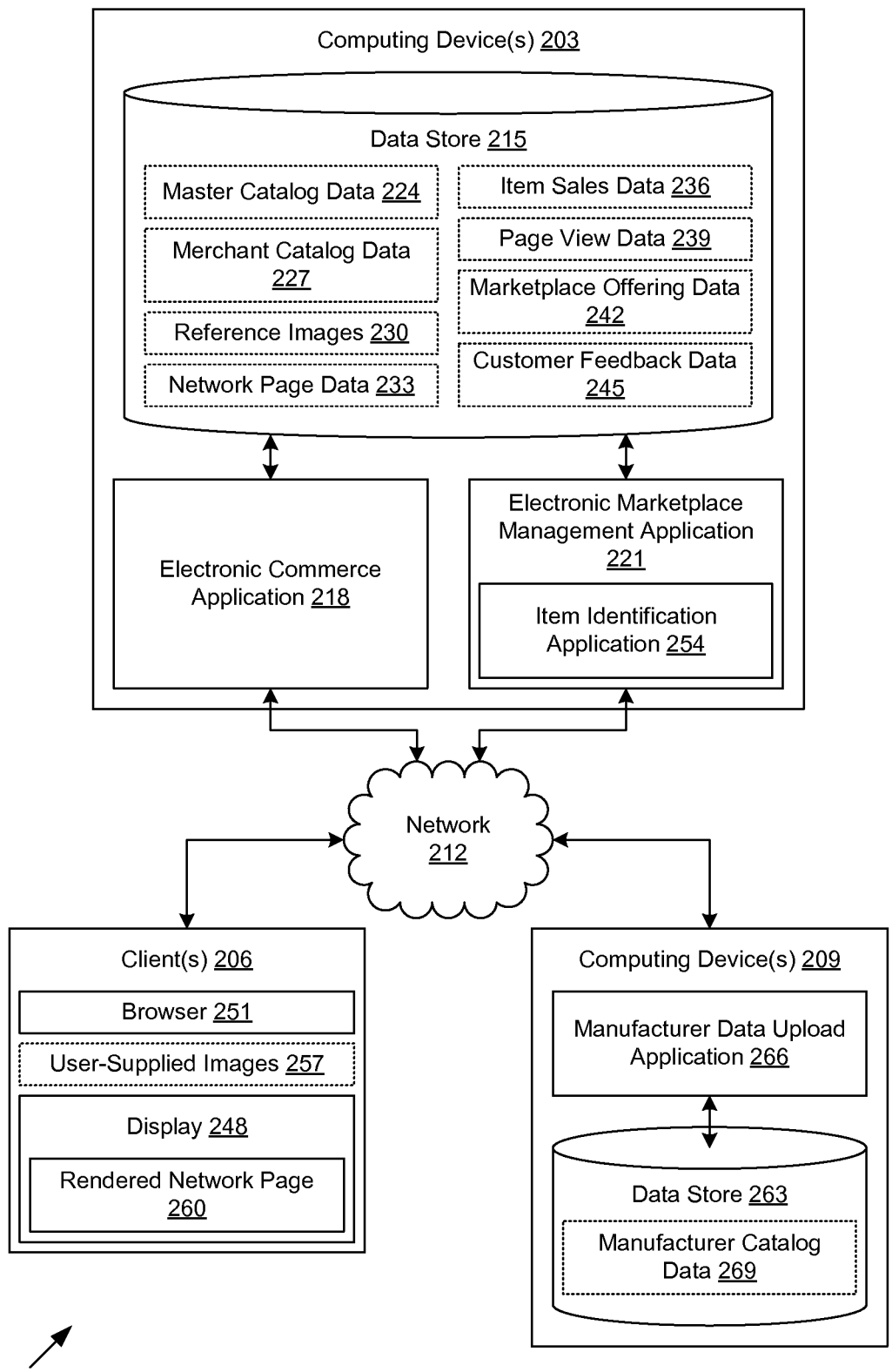

As another example, FIG. 3 shows an alternative embodiment of a networked environment 300. In FIG. 3, the item identification application 254 is shown as a portion of the electronic marketplace management application 221 executed in the computing device 203. In such an embodiment, the user-supplied images 257 or data derived from the user-supplied images 257 may be uploaded over the network 212 to the computing device 203 for analysis by the item identification application 254.

Referring back to FIG. 2, when an item 103 depicted in a user-supplied image 257 has been identified, the item identification application 254 may then associate descriptions of the item 103 stored in the master catalog data 224 with the user-supplied image 257. The associated data may be presented, at least in part, to the user for verification of the identification. As a non-limiting example, the item identification application 254 may render a user interface that shows the user-supplied image 257 adjacent to a title from the master catalog data 224 that has been associated with the user supplied image 257. As another non-limiting example, the item identification application 254 may render a user interface that shows the user-supplied image 257 adjacent to an image from the master catalog data 224 that has been associated with the user supplied image 257.

If the user indicates that the identification was not performed correctly, the user may be provided with a form to submit the data that correctly describes the item 103 shown in the user-supplied image 257. In one embodiment, the item identification application 254 may track misidentified user-supplied images 257 for improving the accuracy of future identifications. Even when an identification is performed correctly, a user may want to modify or customize attributes of the item 103. Such customizations may be stored in the merchant catalog data 227.

Upon identifying items 103 in user-supplied images 257 or adding the items 103 to a catalog, the item identification application 254 may be configured to provide various statistics to the user. These statistics may be related the probability of success the merchant 106 will have in selling the items 103. For example, the item identification application 254 may present a distinctiveness factor for the items 103, a quantity of the items 103 predicted to be needed to avoid going out of stock, a sales success factor based on customer feedback, and/or other statistics.

The item identification application 254 may be configured to generate a data feed from the master catalog data 224 that describes the automatically identified items 103. In one embodiment, the data feed may also include manual edits to the descriptions of the automatically identified items 103 as well as manually defined items 103. Such a data feed may be uploaded to the electronic marketplace management application 221 for inclusion within a catalog of the merchant 106. However, the format of the data feed may be configurable, and the data feed may be uploaded to systems providing other electronic marketplaces 100 that may or may not use the same master catalog data 224 as was used in the generation of the data feed. For example, the data feed may be configurable to exclude or transform one or more attributes of the items 103 provided in the master catalog data 224.

In addition to merchants 106 adding new items 103 which may be integrated into the master catalog data 224, manufacturers, distributors, or other third parties may be able to submit data for inclusion in the master catalog data 224. For example, a manufacturer data upload application 266 executed in a computing device 209 of the manufacturer may be configured to provide the manufacturer catalog data 269 to the electronic marketplace management application 221. Such a data feed may be scheduled periodically or provided in response to a request from the electronic marketplace management application 221. Consequently, the master catalog data 224 may include descriptions of items 103 that are not currently sold by any of the merchants 106 in the electronic marketplace 100.

Figure 4:
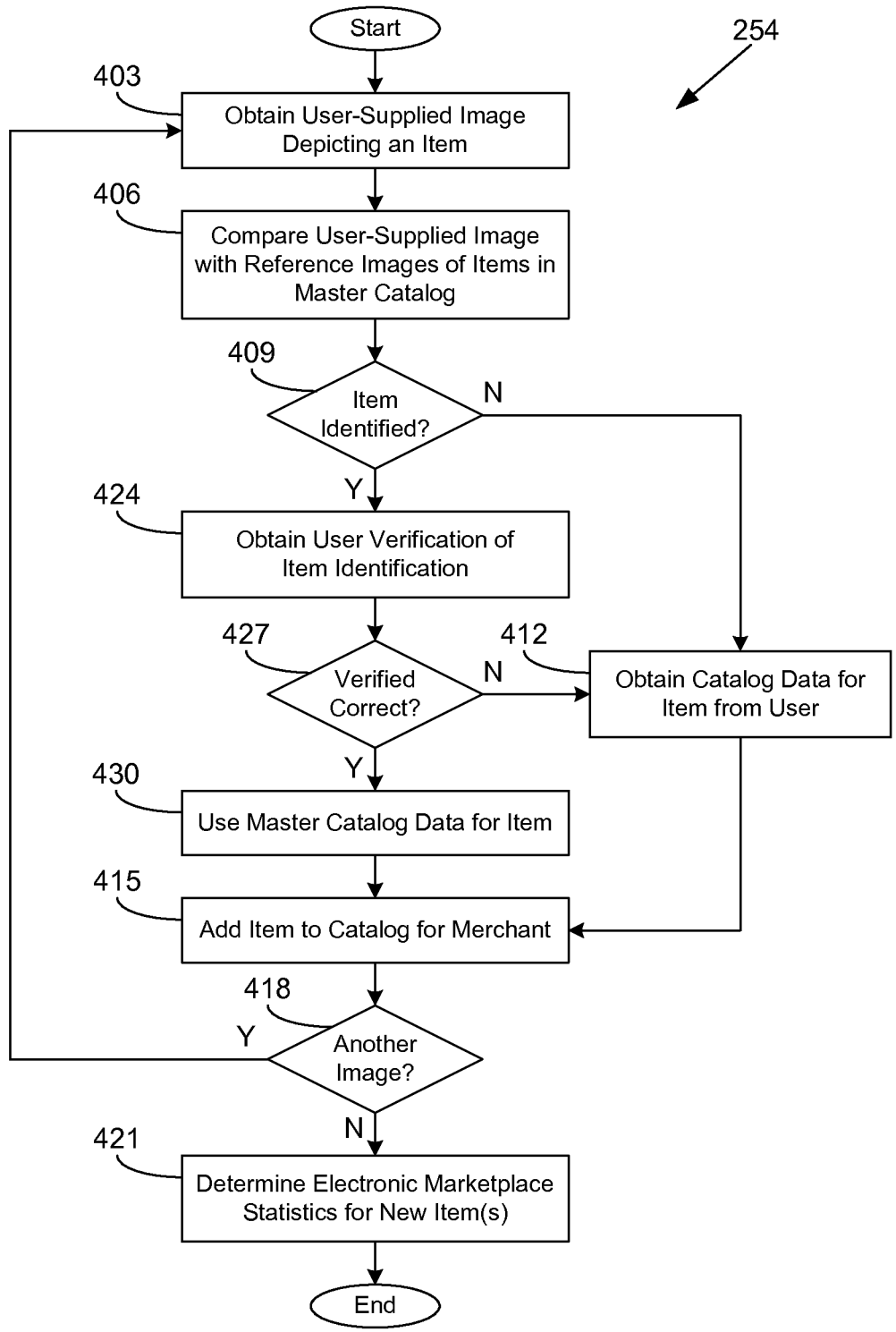
FIG. 4 is a flowchart illustrating one example of functionality implemented as portions of an item identification application executed in a client in the networked environment of FIG. 2 or in a computing device in the networked environment of FIG. 3 according to various embodiments of the present disclosure.

Moving on to FIG. 4, shown is a flowchart that provides one example of the operation of a portion of the item identification application 254 according to various embodiments. It is understood that the flowchart of FIG. 4 provides merely an example of the many different types of functional arrangements that may be employed to implement the operation of the portion of the item identification application 254 as described herein. As an alternative, the flowchart of FIG. 4 may be viewed as depicting an example of steps of a method implemented in the client 206 (FIG. 2) or the computing device 203 (FIG. 3) according to various embodiments. Although the flowchart of FIG. 4 illustrates a process performed on each user-supplied image 257 serially, it is understood that such a process alternatively may be performed on a group of user-supplied images 257 concurrently or simultaneously.

Beginning with box 403, the item identification application 254 obtains a user-supplied image 257 (FIG. 2) depicting an item 103 (FIG. 1). It is understood that more than one item 103 may be depicted in one user-supplied image 257 in some embodiments. The user-supplied image 257 may comprise a digital photo, graphic, scan, or some other image that shows an item 103. In some embodiments, the item identification application 254 may impose restrictions on the user-supplied image 257 relating, for example, to background color, separation between items 103, contrast, etc.

In box 406, the item identification application 254 compares the user-supplied image 257 with reference images 230 (FIG. 2) of items 103 that are described in the master catalog data 224 (FIG. 2). In other embodiments, the item identification application 254 may also compare the user-supplied image 257 with reference images 230 of items 103 that are described in the merchant catalog data 227 (FIG. 2). The analysis performed by the item identification application 254 may involve calculating a fingerprint or hash values, building a histogram, extracting features, and/or other image recognition techniques applied to the user-supplied image 257 and the reference images 230. Various image recognition and/or text recognition techniques are disclosed in U.S. patent application Ser. No. 12/321,235 entitled "System and Method to Match Images," filed Jan. 16, 2009, U.S. patent application Ser. No. 11/732,858 entitled "Method and System for Searching for Information on a Network in Response to an Image Query Sent by a User From a Mobile Communications Device," filed Apr. 4, 2007, and U.S. patent application Ser. No. 12/378,599 entitled "Method and System for Image Matching," filed Feb. 18, 2009, each of which is hereby incorporated by reference herein in its entirety.

To facilitate the analysis of box 406, the item identification application 254, when executed in a client 206, may obtain data derived from the reference images 230 for the identification rather than images themselves. Alternatively, the item identification application 254 may submit data derived from the user-supplied image 257 to the computing device 203 for further analysis to be executed therein.

In box 409, the item identification application 254 determines whether an item 103 has been identified in the user-supplied image 257. If an item 103 has not been identified in the user-supplied image 257, the item identification application 254 moves to box 412 and obtains catalog data for the item 103 depicted in the user-supplied image 257 from the user. A user interface may be provided for the user to enter data manually that describes the item 103 or to upload a data feed with a description. Alternatively, or additionally, a user may be able to search the master catalog data 224 and/or the merchant catalog data 227 by keyword to attempt to identify and import data currently in a catalog. The item identification application 254 may be configured to recognize the item 103 from the corresponding user-supplied image 257 in the future. To this end, the user-supplied image 257 may be added to the reference images 230 in some embodiments.

In box 415, the item identification application 254 adds the item 103 to a catalog for the merchant 106 (FIG. 1) in the merchant catalog data 227. The item identification application 254 then proceeds to box 418 and determines whether another user-supplied image 257 is to be analyzed. If another user-supplied image 257 is to be analyzed, the item identification application 254 returns to box 403 and obtains the user-supplied image 257 and begins processing it. If no other user-supplied image 257 is to be analyzed, the item identification application 254 moves to box 421 and determines electronic marketplace 100 (FIG. 1) statistics for the new items 103.

As a non-limiting example, the item identification application 254 may identify a quantity of one or more of the items 103 to satisfy a demand for the items 103 in the electronic marketplace 100. The quantity may be determined in order for the merchant 106 to avoid being out-of-stock for the items 103 in inventory. To make this determination, the item identification application 254 may evaluate the item sales data 236 (FIG. 2) and other data to determine projected sales for the items 103.

As another non-limiting example, the item identification application 254 may determine a sales success factor based at least in part on customer feedback data 245 (FIG. 1) for the items 103 associated with the master catalog data 224 and/or the merchant catalog data 227. For example, items 103 associated with relatively higher levels of customer satisfaction may be associated with increased future sales. Likewise, items 103 associated with relatively lower levels of customer satisfaction may be associated with decreased future sales. Such a sales success factor may be computed in an aggregate for all of the items 103 added by the merchant 106 to give the merchant 106 an estimate of how successful the merchant 106 will be in selling that batch of items 103.

As yet another non-limiting example, the item identification application 254 may determine a distinctiveness factor for the items 103 based at least in part on a number of merchants 106 offering the items 103 in the electronic marketplace 100. The number of merchants 106 offering the items 103 may be determined, for example, using the marketplace offering data 242 (FIG. 2). In addition, the distinctiveness factor may be based in part on a number of distinct offerings of the items 103 in the electronic marketplace 100. The distinctiveness factor may relate to how successful the merchant 106 will be in selling the items 103 because the offerings of the merchant 106 may be more visible to shoppers when fewer other merchants 106 are also offering the items 103.

Such statistics may be presented to the user by the item identification application 254 in a user interface. The user may refer to the statistics to assess projected performance of the added items 103 in order to make future catalog modifications. Thereafter, the portion of the item identification application 254 ends.

If, in box 409, the item identification application 254 instead identifies an item 103 in the user-supplied image 257, the item identification application 254 proceeds to box 424 and obtains a user verification of the identification of the item 103. To facilitate verification, catalog data such as title, description, etc. that is used to describe the item 103 may be presented in association with the user-supplied image 257. In box 427, the item identification application 254 determines whether the user has verified that the identification was correct. If the identification has not been verified as correct, the item identification application 254 may proceed to box 412 and obtain catalog data for the item 103 from the user as previously described and continue on from there.

If, in box 427, the identification has been verified as correct, the item identification application 254 instead moves to box 430 and uses the master catalog data 224 for the item 103. In other embodiments, the item identification application 254 may use catalog data currently stored in the merchant catalog data 227 for the item 103. The item identification application 254 then proceeds to box 415 and adds the item 103 to the catalog for the merchant 106. To this end, the item identification application 254 may link the catalog data in the master catalog data 224 that describes the item 103 to the merchant catalog data 227. The item identification application 254 then continues on to box 418 as previously described.

Figure 5:
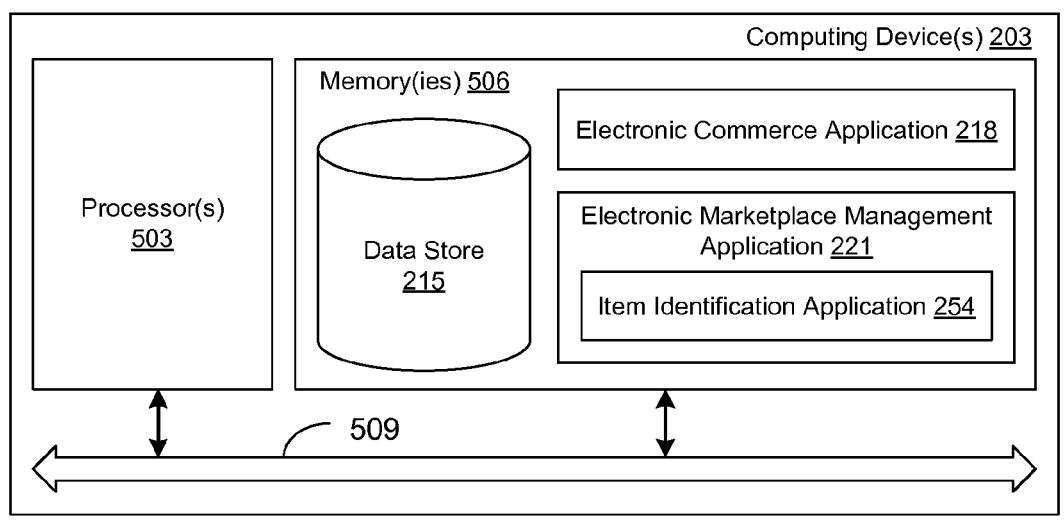
FIG. 5 is a schematic block diagram that provides one example illustration of a computing device employed in the networked environment of FIG. 3 according to various embodiments of the present disclosure.

With reference to FIG. 5, shown is a schematic block diagram of the computing device 203 according to an embodiment of the present disclosure. The computing device 203 includes at least one processor circuit, for example, having a processor 503 and a memory 506, both of which are coupled to a local interface 509. To this end, the computing device 203 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are an electronic commerce application 218, an electronic marketplace management application 221, an item identification application 254, and potentially other applications. Also stored in the memory 506 may be a data store 215 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 212 (FIG. 2) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application 218, the electronic commerce management application 221, the item identification application 254, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the item identification application 254. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 218, the electronic marketplace management application 221, and the item identification application 254, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method, comprising:
   obtaining, by a first computing device, an image depicting a plurality of items;
   obtaining, by the first computing device, data derived from a plurality of reference images, individual ones of the plurality of reference images being associated with a corresponding one of a plurality of reference items, the data being obtained from a second computing device;
   identifying, by the first computing device, the plurality of items from the image based at least in part on the data derived from the plurality of reference images;
   associating, by the first computing device, catalog data with the image, the catalog data corresponding to the plurality of items;
   adding, by the first computing device, the catalog data to an electronic catalog in an electronic marketplace;
   determining a corresponding sales success factor for individual ones of the plurality of items based at least in part on customer feedback associated with the catalog data;
   obtaining an indication that the identifying was incorrectly performed; and
   tracking, responsive to the indication, the image as a misidentified image.

2. The computer-implemented method of claim 1, further comprising determining a corresponding quantity of individual ones of the plurality of items to satisfy a demand for the individual ones of the plurality of items in the electronic marketplace.

3. The computer-implemented method of claim 1, wherein the associating further comprises generating a data feed that includes the catalog data associated with the image.

4. The computer-implemented method of claim 3, wherein the catalog data comprises a plurality of item attributes, and the data feed is configured to exclude at least one of the item attributes.

5. The computer-implemented method of claim 1, further comprising adding, by the computing device, the image to the plurality of reference images as associated with at least one of the plurality of reference items corresponding to at least one of the plurality of items from the image.

6. A system, comprising:
   a first computing device; and
   an item identification application executable in the first computing device, the item identification application comprising:

logic that obtains an image depicting a plurality of items;

logic that obtains data derived from a plurality of reference images, individual ones of the plurality of reference images being associated with a corresponding one of a plurality of reference items, the data being obtained from a second computing device;

logic that identifies the plurality of items from the image based at least in part on the data derived from the plurality of reference images;

logic that associates catalog data with the image, the catalog data corresponding to the plurality of items;

logic that adds the catalog data to a catalog in an electronic marketplace;

logic that determines a corresponding sales success factor for individual ones of the plurality of items based at least in part on customer feedback associated with the catalog data;

logic that obtains an indication that the identifying was incorrectly performed; and logic that, responsive to the indication, tracks the image as a misidentified image.

7. The system of claim 6, wherein the logic that identifies further comprises logic that compares an image characteristic calculated for the image with a plurality of stored image characteristics in the data derived from the reference images.

8. The system of claim 6, wherein the item identification application further comprises logic that determines a corresponding quantity of individual ones of the plurality of items to satisfy a demand for the individual ones of the plurality of items in the electronic marketplace.

9. The system of claim 6, wherein the item identification application further comprises logic that determines a corresponding distinctiveness factor for the individual ones of the plurality of items based at least in part on a number of merchants offering the individual ones of the plurality of items in the electronic marketplace.

10. The system of claim 6, wherein the catalog data associated with the image includes a corresponding description of individual ones of the plurality of items.

11. The system of claim 6, wherein the logic that associates is configured to generate a data feed that includes the catalog data associated with the image.

12. The system of claim 11, wherein the catalog data comprises a plurality of item attributes, and the data feed is configured to exclude at least one of the item attributes.

13. The system of claim 6, wherein the item identification application further comprises logic that obtains catalog data about a particular one of the plurality of items from a user when the logic that identifies is unable to identify the particular one of the plurality of items.

14. The system of claim 6, wherein the item identification application further comprises logic that obtains additional catalog data about a particular one of the plurality of items from a manufacturer of the particular one of the plurality of items.

15. The system of claim 6, wherein the first computing device comprises a client computing device, the second computing device comprises a server computing device, and the item identification application further comprises logic that obtains the data derived from the reference images and the catalog data from the server computing device.

16. The system of claim 6, wherein the item identification application further comprises:

logic that obtains an indication that at least one of the items is correctly identified from the image; and logic that, responsive to the indication, adds the image to the plurality of reference images as associated with at least one of the reference items corresponding to the at least one of the items.

17. The system of claim 9, wherein the corresponding distinctiveness factor is further based at least in part on a number of distinct listings for the individual ones of the plurality of items in the electronic marketplace.

18. A non-transitory computer-readable medium embodying a program executable in a first computing device, wherein the program when executed causes the first computing device to:

obtain an image depicting a plurality of items;

obtain data derived from a plurality of reference images, individual ones of the plurality of reference images being associated with a corresponding one of a plurality of reference items, the data being obtained from a second computing device;

identify the plurality of items from the image based at least in part on the data derived from the plurality of reference images;

associate catalog data with the image, the catalog data corresponding to the plurality of items;

add the catalog data to a catalog in an electronic marketplace;

determine a corresponding sales success factor for individual ones of the plurality of items based at least in part on customer feedback associated with the catalog data;

obtain an indication that the identifying was incorrectly performed; and track, responsive to the indication, the image as a misidentified image.

19. The non-transitory computer-readable medium of claim 18, wherein the program when executed further causes the first computing device to determine a corresponding quantity of individual ones of the plurality of items to satisfy a demand for the individual ones of the plurality of items in the electronic marketplace.

20. The non-transitory computer-readable medium of claim 18, wherein to associate catalog data corresponding to the item with the image further comprises generating a data feed that includes the catalog data associated with the image, the catalog data comprising a plurality of item attributes, and the data feed configured to exclude at least one of the item attributes.

* * * * *